United States Patent [19]

Sugawara

[11] Patent Number: 5,696,039
[45] Date of Patent: Dec. 9, 1997

[54] GLASS AND FIBER OPTIC PLATE USING THE SAME

[75] Inventor: Takeo Sugawara, Hamamatsu, Japan

[73] Assignee: Hamamatsu Photonics K.K., Hamamatsu, Japan

[21] Appl. No.: 674,802

[22] Filed: Jul. 3, 1996

[30] Foreign Application Priority Data

Jul. 4, 1995 [JP] Japan ................................. 7-168711

[51] Int. Cl.$^6$ ................................. C03C 3/068
[52] U.S. Cl. .................... 501/78; 501/64; 501/73
[58] Field of Search ........................ 501/73, 78, 64

[56] References Cited

U.S. PATENT DOCUMENTS

| | | | |
|---|---|---|---|
| 3,193,503 | 7/1965 | Smith | 501/73 |
| 3,679,443 | 7/1972 | Mechel et al. | 501/73 |
| 3,964,360 | 6/1976 | Weaver | 501/73 |
| 4,042,519 | 8/1977 | Weaver | 501/73 |
| 4,043,821 | 8/1977 | Le Bras | 501/73 |
| 5,198,393 | 3/1993 | Grebe et al. | 501/64 |
| 5,439,852 | 8/1995 | Hormadaly | 501/73 |

FOREIGN PATENT DOCUMENTS

| | | |
|---|---|---|
| 0 159 173 | 10/1985 | European Pat. Off. . |
| 1 064 867 | 9/1959 | Germany . |
| 2-086384 | 2/1990 | Japan . |
| 1030328 | 7/1983 | U.S.S.R. . |
| 1038302 | 8/1983 | U.S.S.R. . |
| 1058912 | 12/1983 | U.S.S.R. . |
| 1105482 | 7/1984 | U.S.S.R. . |
| 1196340 | 12/1985 | U.S.S.R. . |

OTHER PUBLICATIONS

Database WPI, Section Ch, Week 8634, Derwent Publication Ltd., London, GB; Class L01, AN 86-221211 XP002015668 & JP-A-61 151 035 (Ohara Kogaku Glass), Jul. 9, 1986.

Database WPI, Section Ch, Week 8823, Derwent Publications Ltd., London, GB; Class L01, AN 88-159644 XP002015669 & SU-A-1 350 123 (Vladimir Poly), Nov. 7, 1987.

Database WPI, Section Ch, Week 8737, Derwent Publications Ltd., London, GB; Class L01, AN 87-262268 XP002015670 & SU-A-1 286 550 (Vladimir Poly), Jan. 30, 1987.

Database WPI, Section Ch, Derwent Publications Ltd., London, GB; Class L01, AN 71-61066S XP002015673 & SU-A286 161 (Konstantinovo "Avtosteklo) 1983 (No Month).

Ehrt et al, "Eiubau und Verteilnag von $Fe_2O_3$ auf die Mikrophasen in Grundglasern des Systems $Na_2O$–$B_2O_3$–$SiO_2$, Silikattechnik," vol. 27, No. 9, Sep. 1976, Berlin.

Kashif et al, "Infrared Spectra and X-ray Investigation of Lithium Borosilicate Glasses Containing Vanadium and Iron", Physics and Chemistry of Glasses, vol. 32, No. 3, Jun. 1991.

Primary Examiner—Mark L. Bell
Assistant Examiner—Louis M. Troilo
Attorney, Agent, or Firm—Cushman Darby & Cushman IP Group of Pillsbury Madison & Sutro LLP

[57] ABSTRACT

The object of the present invention is to provide an absorber glass for FOP having a broad absorption band which extends from ultraviolet region through visible region to near infrared region. The absorber glass of the present invention contains FeO, 18 to 40% by weight of $SiO_2$ and not less than 20% by weight of FeO and $Fe_2O_3$ in total.

15 Claims, 4 Drawing Sheets

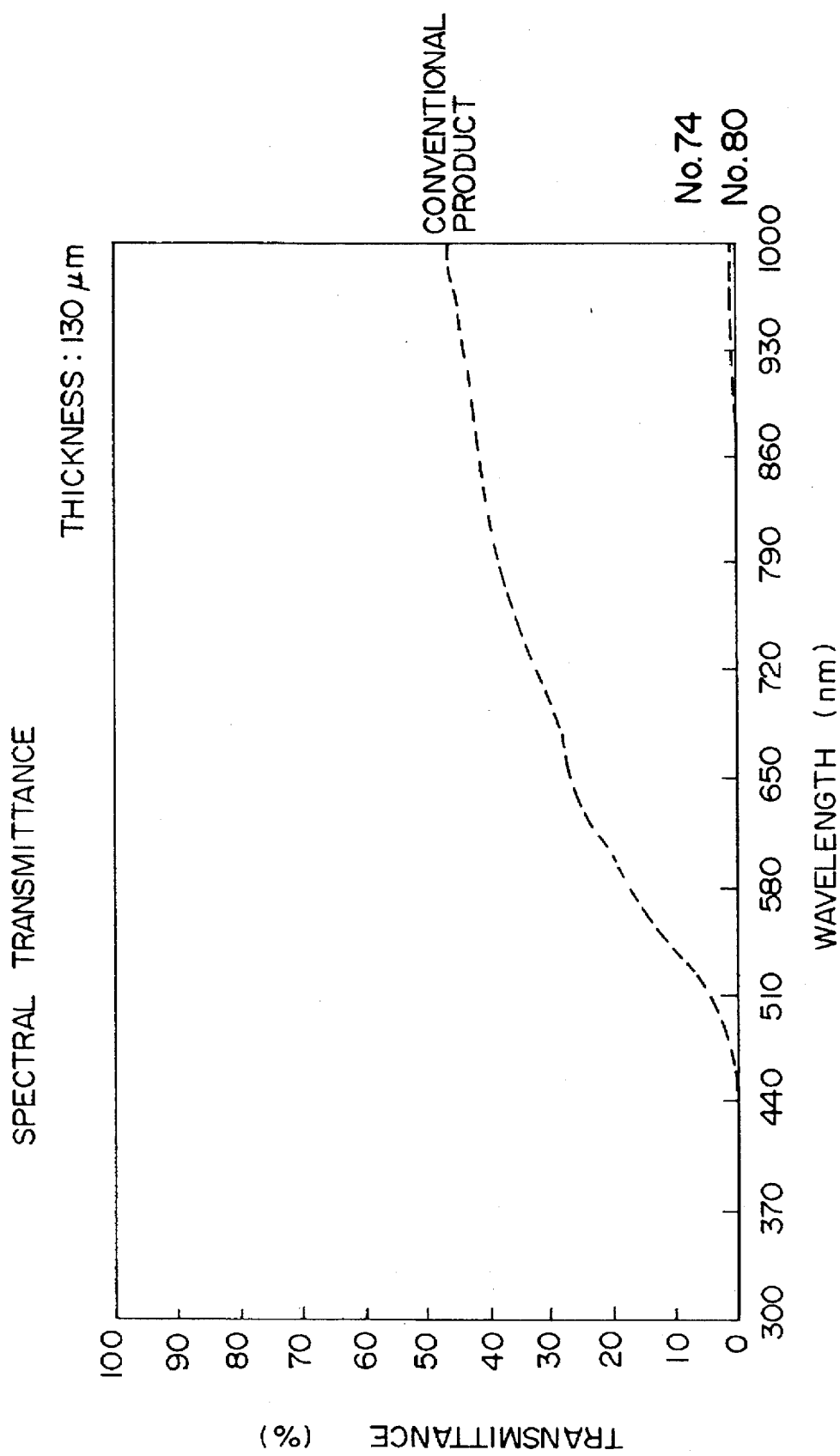

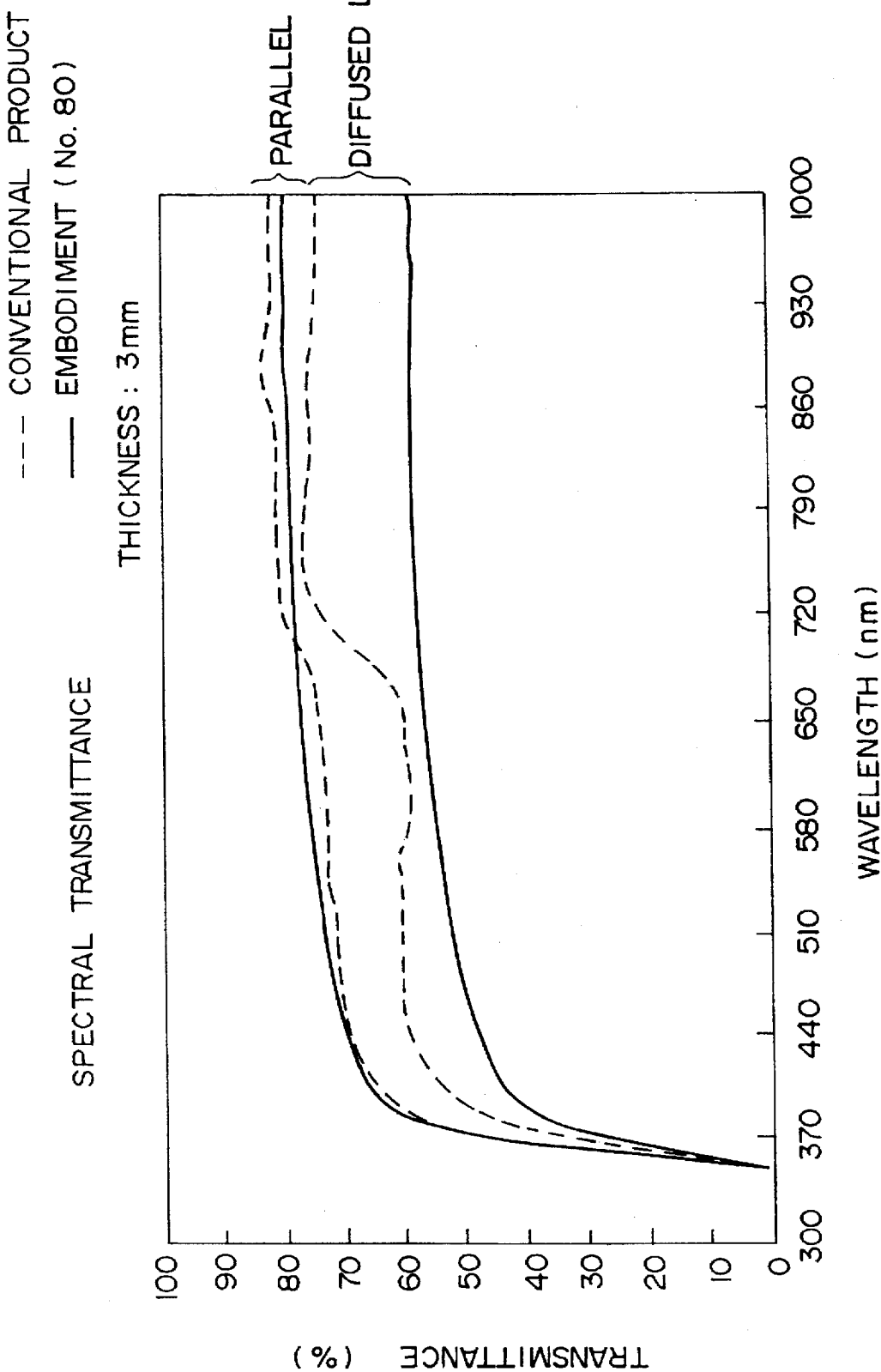

GLASS AND FIBER OPTIC PLATE USING THE SAME

BACKGROUND OF THE INVENTION

1. Field of the Invention

The present invention relates to an absorber glass which can be used in a fiber optic plate (referred to as "FOP" hereinafter) and the FOP using the same.

2. Related Background Art

An FOP is a planar image device constituted by a plurality of optical fibers and used as an optical waveguide for optical instruments such as face plates of image intensifiers and CRTs and CCD couplings.

FIG. 1 is a cross-sectional view of a typical FOP taken along a direction perpendicular to its optical path. As shown in FIG. 1, an FOP 500 is constituted by a core glass 502 with a high refractive index, a clad glass 504 with a low refractive index coated on the core glass 502, and an absorber glass 506 for absorbing stray light.

The FOP is manufactured in the following manner. A thin single fiber in which a core glass is coated with a clad glass and an absorber glass are assembled together, and thus made assemblies are arranged in a fiber direction and fused together under high temperature and high pressure. Thereafter, thus fused assemblies are cut in a direction perpendicular to the fiber direction, whereby an FOP having a cross section such as that shown in FIG. 1 is obtained.

FIG. 2 is a schematic cross-sectional view of the core of the FOP. As shown in FIG. 2, light incident on the FOP repeats total reflection within the fiber and is efficiently transmitted from the incident surface to the exit surface with a high resolution. In this case, part of light leaks from the core glass without being totally reflected. In order to prevent such a light component from entering other core glasses, an absorber glass is disposed. Basic configurations and characteristics of the FOP are disclosed in such publications as Kazumi Nagao, "Optical Fiber," Kyoritsu Shuppan, 1974 and Nakayama et al., ITEJ (the Institute of Television Engineers of Japan) Technical Report, vol. 4, no. 53, pp. 1–6, IPU90-44, Sept. 1990.

Conventionally typical absorber glasses contain oxide colorants such as NiO, $Ni_2O_3$, CoO, $Co_2O_3$, $Cr_2O_3$, CuO, $MnO_2$, SnO, $V_2O_5$, and $WO_3$ for absorbing stray light. In order to improve characteristics of the absorber glass, it is necessary to select an oxide colorant having a broad absorption wavelength band. Also, when making FOPs, the oxide colorant to be selected should not generate discoloring at a fusion step under high temperature and high pressure, a drawing step for making fiber, or the like and should not devitrify the core glass upon diffusion or the like.

Japanese Unexamined Patent Publication No. 2-38343 discloses an absorber glass for FOP which comprises basic five ingredients of $SiO_2$, $B_2O_3$, $La_2O_3$, BaO, and $TiO_2$ without including PbO, CdO, $Bi_2O_3$, $As_2O_3$, $Sb_2O_3$, F, and Cl. This publication also mentions the content of each ingredient which enables vitrification. For example, it states that, when the content of $Fe_2O_3$, which is supposed to provide a coloring effect, is 15% or more, the glass becomes unstable.

SUMMARY OF THE INVENTION

An object of the present invention is to provide an absorber glass for FOP having a broad absorption band which extends from ultraviolet region through visible region to near infrared region.

Another object of the present invention is to provide an absorber glass for FOP having an absorptivity which is stable and high in a broad absorption band.

As a result of diligent studies, the inventors have found that a glass can contain both FeO and $Fe_2O_3$ and that the resulting glass has a broad absorption band which extends from ultraviolet region through visible region to near infrared region. Further, as a result of numerous tests and studies based on this finding, the inventors have found that, in order for the glass to contain both FeO and $Fe_2O_3$ at high contents so as to attain a high absorptivity, while enabling vitrification, it is effective to increase the content of $SiO_2$ at the same time, thereby accomplishing the present invention. It has also been found that, when FeO or $Fe_2O_3$ is used alone, its content can be similarly increased when the content of $SiO_2$ is increased.

Accordingly, the absorber glass of the present invention contains 18 to 40% by weight of $SiO_2$ and not smaller than 20% by weight of FeO and $Fe_2O_3$ in total.

Also, the absorber glass of the present invention may comprise, in % by weight, 18 to 40% of $SiO_2$, 0 to 10% of $B_2O_3$, 0 to 15% of $TiO_2$, 25 to 40% of BaO, 4 to 20% of $La_2O_3$, 3 to 30% of FeO, 3 to 30% of $Fe_2O_3$, and 0 to 15% of $Co_2O_3$.

Further, in the absorber glass of the present invention, $SiO_2$, FeO, and $Fe_2O_3$, in % by weight, may have the following relationship:

(content of $SiO_2$)+(content of FeO)+(content of $Fe_2O_3$)>50%

Also, the absorber glass of the present invention may further comprise 3 to 6% by weight of $Ni_2O_3$.

Further, the absorber glass of the present invention may comprise, in % by weight, 20 to 35% of $SiO_2$, 0 to 6% of $B_2O_3$, 5 to 12% of $TiO_2$, 25 to 35% of BaO, 7 to 10% of $La_2O_3$, 3 to 9% of FeO, 7 to 21% of $Fe_2O_3$, and 0 to 10% of $Co_2O_3$.

Also, the absorber glass of the present invention may substantially contain neither CoO nor $Co_2O_3$.

Further, the absorber glass of the present invention may comprise, in % by weight, 23 to 31% of $SiO_2$, 0 to 6% of $B_2O_3$, 7 to 11% of $TiO_2$, 30 to 32% of BaO, 7 to 8% of $La_2O_3$, 3 to 5% of FeO, 8 to 12% of $Fe_2O_3$, while substantially containing neither CoO nor $Co_2O_3$.

Also, the absorber glass of the present invention may comprise, in % by weight, 28 to 31% of $SiO_2$, 7 to 11% of $TiO_2$, 30 to 32% of BaO, 7 to 8% of $La_2O_3$, 6 to 9% of FeO, 15 to 21% of $Fe_2O_3$, while substantially containing neither CoO nor $Co_2O_3$.

Further, the absorber glass of the present invention may substantially contain no $B_2O_3$.

Since the absorber glass of the present invention contain large amounts of FeO and $Fe_2O_3$, it exhibits a high absorptivity in a broad range from visible region to near infrared region. As the content of $SiO_2$ is increased together, the upper limit of these iron oxides for enabling vitrification is greatly alleviated, whereby a stable glass with a large content of the iron oxides can be obtained.

In an embodiment substantially containing neither CoO nor $Co_2O_3$, it does not contain $Co^{2+}$ and $Co^{3+}$ which are likely to diffuse from the absorber glass to other parts. Accordingly, when such a glass is used in an FOP, the transmittance of the core is prevented from deteriorating due to diffusion of cobalt ions into the core. Since this absorber glass contains FeO and $Fe_2O_3$ with neither CoO nor $Co_2O_3$, it has a favorable absorbing capacity in a broad range.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 4 is a spectral transmittance chart for an absorber glass having a thickness of 130 μm; and FIG. 5 is a spectral transmittance chart for an FOP having a thickness of 3 mm.

DESCRIPTION OF THE PREFERRED EMBODIMENTS

Figure 1:
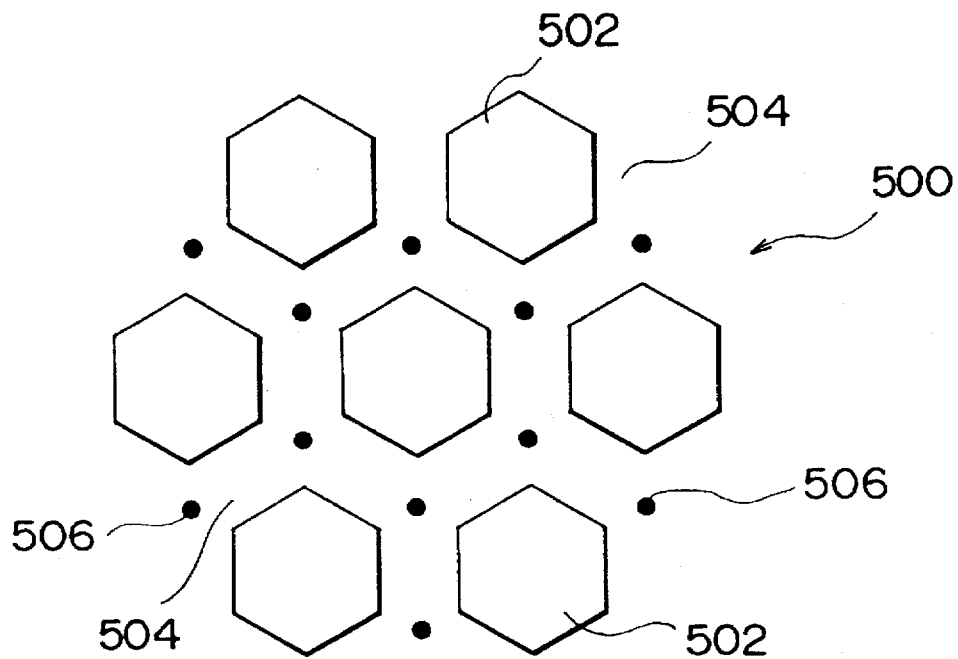
FIG. 1 is a cross-sectional view of an FOP.
Figure 2:
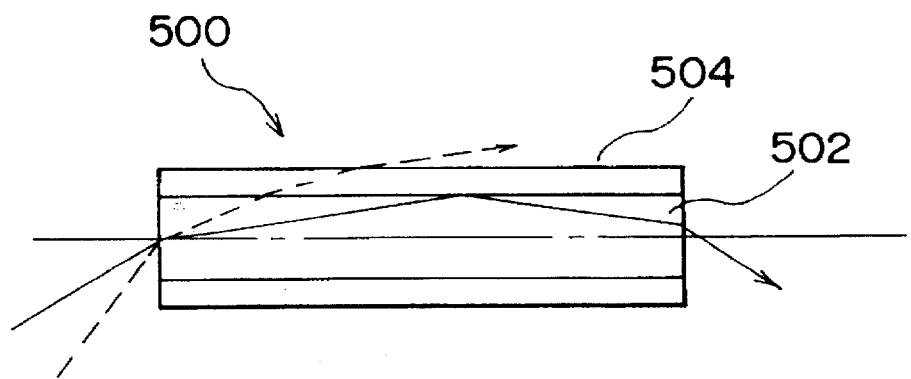
FIG. 2 is a schematic cross-sectional view of a core of an FOP.

In recent years, image transmission has been widely performed not only in visible region but also in near infrared region. Though the conventional FOPs uses an absorber glass which has a high absorptivity in the visible light near 550 nm, its capacity for absorbing stray light in near infrared region is not sufficient for preventing the resolution of images in near infrared region from deteriorating.

While it is indicated that the above-mentioned absorber glass disclosed in Japanese Unexamined Patent Publication No. 2-38343 has a favorable absorption at 800 nm, no absorptivity is shown with respect to the visible region centered around the vicinity of 590 nm. Also, it fails to mention any means for increasing the content of colorant oxides so as to maintain a high absorbing capacity in a broad band.

In the following, the absorber glass of the present invention will be explained in terms of constituent ingredients thereof.

$B_2O_3$

It is an oxide for forming the glass. While vitrification becomes easier when this oxide is added to the glass, it is not always necessary for the glass to contain this ingredient. When its content exceeds 10%, the density of the glass becomes so small that the absorbing capacity of the absorber glass decreases.

$SiO_2$

It is an oxide, like $B_2O_3$, for forming the glass and is essential for the present invention. When its content is less than 18%, the glass cannot contain a large amount of the colorants mentioned hereinafter. Also, when it exceeds 40%, the content of the colorants cannot be increased, whereby the absorbing capacity decreases.

$TiO_2$

When $TiO_2$ is added to the glass when a large amount of colorants such as FeO and $Fe_2O_3$ is contained therein, vitrification becomes easier. It also functions to harden the glass. When its content exceeds 15%, however, vitrification becomes difficult. Though the effect of addition becomes small when its content is less than 5%, it may not always be contained, i.e., it may be 0%.

BaO

It functions to broaden the vitrification range and increase the coefficient of thermal expansion. When a large amount of colorants are added to the glass in the case where BaO content is less than 5%, vitrification cannot be attained. When it exceeds 40%, on the other hand, there is no room for colorants to be contained therein.

$La_2O_3$

It functions to facilitate vitrification and increase the density of the glass. As the density of the glass increases, the absorbing capacity of colorants improves. The effect of addition is small when the content is less than 4%, whereas vitrification becomes difficult when it exceeds 20%.

FeO

It is a colorant having a favorable absorption characteristic in near infrared region, in particular. When its content is less than 3%, the absorption characteristic of the absorber glass in near infrared region becomes insufficient. When it exceeds 30%, vitrification becomes difficult.

$Fe_2O_3$

It is a colorant having a favorable absorption characteristic from ultraviolet region to visible region, in particular. When its content is less than 3%, the absorption characteristic of the absorber glass in near infrared region becomes insufficient. When it exceeds 30%, vitrification becomes difficult.

$Co_2O_3$

Though it is a colorant having an absorption characteristic mainly in visible region, it is not essential for the present invention. When its content exceeds 15%, vitrification becomes difficult. As will be explained later, since $Co^+$ diffused into the core portion and thereby deteriorated its transmission characteristic in the FOP prepared with an absorber glass containing $Co_2O_3$, preferably, it may not be contained.

In the following, embodiments of the present invention will be explained. In the attached drawings, elements identical to each other will be referred to with marks identical to each other, without their overlapping explanations being repeated.

The method of making the absorber glass fiber in accordance with the present invention will be briefly explained in the following. The ingredients in these embodiments had respective material forms as follows:

| Ingredient | Material |
| --- | --- |
| $B_2O_3$ | boric acid ($H_3BO_3$) |
| $SiO_2$ | silicic anhydride ($SiO_2$) |
| $TiO_2$ | titanium oxide ($TiO_2$) |
| BaO | barium carbonate ($BaCO_3$) |
| $La_2O_3$ | lanthanum oxide ($La_2O_3$) |
| FeO | iron (II) oxide (FeO) |
| $Fe_2O_3$ | iron (III) oxide ($Fe_2O_3$) |
| $Co_2O_3$ | cobalt (III) oxide ($Co_2O_3$) |

After all these materials are uniformly mixed together, the resulting mixture is put into a quartz crucible, where it is heated to 1250° C. so as to be roughly melted. At the time when substantially all the ingredients are melted, the melt is taken out from the quartz crucible and rapidly cooled so that a cullet is formed. This process is repeated. Then, thus prepared cullet is put into a platinum crucible and heated to 1350° C. so as to be melted. This melting time is two hours. During two hours of melting, the melt is stirred three times with a platinum rod so as to be homogenized. After two hours have passed, the temperature is gradually lowered, and when the melt attains an appropriate viscosity, the melt is made to flow into a mold having a rod-shaped cavity. This melt, together with the mold, is put into an electric furnace, within which the temperature has been set to 720° to 730° C. beforehand, so as to be subjected to an annealing process. Then, when the melt has a predetermined temperature within the electric furnace, the power of the electric furnace is turned off so as to cool the melt naturally. Here, a rod of the absorber glass is accomplished. Thereafter, the rod of the absorber glass is taken out from the mold, shaven and polished to a predetermined size, and then processed into a glass fiber for FOP.

Initially, the inventors selected the colorant oxides as follows. Here, the object of the present invention is to attain a favorable absorption characteristic in a broad band ranging from ultraviolet region through visible region to near infrared region and, in particular, to favorably maintain the absorption in visible region while improving the absorption characteristic in near infrared region. As ingredients for providing a favorable absorption characteristic in near infrared region, $Cu^{2+}$ and $Fe^{2+}$ have been well-known. Taking into consideration that the oxides including these ingredients should be contained in the absorber glass, a composition which can further provide a favorable absorption characteristic in ultraviolet to visible regions has been searched. In order to attain an absorbing capacity in a broad band, the composition has been made to contain at least FeO and $Fe_2O_3$ as colorant oxides. Also, the content of the colorant oxides has been increased as much as possible in order to attain a high absorbing capacity. Here, the search has been conducted while the fact that the combination and content of the colorant oxides may influence the degree of vitrification is taken into account.

Initially, an absorber glass composed of 19% of $SiO_2$, 6% of $B_2O_3$, 16% of $La_2O_3$, 36% of BaO, 8% of $TiO_2$, 2.4% of FeO, 5.6% of $Fe_2O_3$, 1% of $Co_2O_3$, and 6% of CuO was prepared according to the above-mentioned method. When the transmittance of this absorber glass (referred to as "EMA" hereinafter) at 790 nm was measured, it was 0.5% for the EMA having a thickness of 250 μm. Namely, it was elucidated that this EMA had a quite favorable absorbing capacity in near infrared region.

When this EMA was drawn together with core and clad portions so as to prepare an FOP, however, the EMA was crystallized. Further tests performed with varied temperature conditions for this drawing step have revealed that the temperature condition under which the EMA is not crystallized is quite limited, namely, it has been clarified that the temperature control at the drawing step is quite difficult. Further, $Cu^{2+}$ in the EMA easily diffused into the core, thereby remarkably coloring the core. It has been elucidated that the spectral transmittance of this FOP greatly decreases in the visible to near infrared region, thereby making the FOP practically unusable. Accordingly, it has been decided that the EMA of the present invention should contain no Cu ions.

Then, with respect to the above composition, the EMA containing about 5 to 6% of conventional colorants instead of 6% of CuO was prepared, and its vitrification and absorption in the vicinity of 790 nm were evaluated. As the colorant oxide used in place of CuO; $Ni_2O_3$, $MnO_2$, $Co_2O_3$, SnO, $V_2O_5$, $WO_3$, and $Cr_2O_3$ were individually used. As a result, it has been elucidated that vitrification is insufficient when $MnO_2$, SnO, $V_2O_5$, $WO_3$, or $Cr_2O_3$ is used, whereas vitrification is sufficiently achieved when about 5 to 6% of $Ni_2O_3$ or $Co_2O_3$ is used.

In view of the foregoing results, studies have been conducted in order to optimize the composition. Namely, 12 kinds of EMAs having different compositions were prepared. Then, the transmittance of each EMA within the wavelength range from about 300 nm to about 1,000 nm was measured. The respective compositions of these 12 kinds of glasses are shown in the following Tables 1 and 2. All these glasses were favorably vitrified.

TABLE 1

Unit: weight %

| Sample No. | 40 | 57 | 58 | 59 | 60 | 61 |
|---|---|---|---|---|---|---|
| $SiO_2$ | 18.1 | 21.3 | 24.8 | 28.0 | 30.9 | 33.6 |
| $B_2O_2$ | 5.7 | 5.6 | 5.3 | 5.1 | 4.9 | 4.7 |
| $La_2O_3$ | 17.1 | 8.3 | 8.0 | 7.6 | 7.3 | 7.0 |
| BaO | 34.3 | 33.3 | 31.9 | 30.5 | 29.3 | 28.1 |
| $TiO_2$ | 7.6 | 7.4 | 7.1 | 6.8 | 6.5 | 6.3 |
| FeO | 3.4 | 4.4 | 4.3 | 4.1 | 3.9 | 3.8 |
| $Fe_2O_3$ | 8.0 | 10.4 | 9.9 | 9.5 | 9.1 | 8.7 |
| $Ni_2O_3$ | 4.8 | 0 | 0 | 0 | 0 | 0 |
| $Co_2O_3$ | 1.0 | 9.3 | 8.8 | 8.5 | 8.1 | 7.8 |
| $MnO_2$ | 0 | 0 | 0 | 0 | 0 | 0 |
| CuO | 0 | 0 | 0 | 0 | 0 | 0 |
| Transmittance of 100-μm thick plate (790 nm) <TMA> (%) | 34 | 17.5 | 12.5 | 18 | 19 | 23 |
| $\alpha(\times 10^{7}\ °C^{-1})$ | — | 69.9 | 67.4 | 65.9 | 68.4 | 78.4 |
| Tg(°C.) | — | 629 | 621 | 616 | 647 | 617 |
| At(°C.) | — | 710 | 704 | 704 | 680 | 685 |

TABLE 2

Unit: weight %

| Sample No. | 70 | 71 | 75 | 76 | 74 | 80 |
|---|---|---|---|---|---|---|
| $SiO_2$ | 29.1 | 29.3 | 29.1 | 29.1 | 29.1 | 30.1 |
| $B_2O_3$ | 0 | 0 | 0 | 0 | 0 | 0 |
| $La_2O_3$ | 7.7 | 10.3 | 7.7 | 7.7 | 7.7 | 8.9 |
| BaO | 30.8 | 31.0 | 30.8 | 30.8 | 30.8 | 31.9 |
| $TiO_2$ | 10.3 | 6.9 | 10.3 | 10.3 | 10.3 | 7.1 |
| FeO | 4.1 | 4.1 | 0 | 22.2 | 6.7 | 6.9 |
| $Fe_2O_3$ | 9.6 | 9.7 | 22.2 | 0. | 15.5 | 16.1 |
| $Ni_2O_3$ | 0 | 0 | 0 | 0 | 0 | 0 |
| $Co_2O_3$ | 8.5 | 8.6 | 0 | 0 | 0 | 0 |
| $MnO_2$ | 0 | 0 | 0 | 0 | 0 | 0 |
| CuO | 0 | 0 | 0 | 0 | 0 | 0 |
| Transmittance of 100-μm thick plate (790 nm) <TMA> (%) | 12.5 | 19 | 0.77 | 1.7 | 0.98 | 0.77 |
| $\alpha(\times 10^{7}\ °C^{-1})$ | 70.9 | 66.9 | 78.9 | 77.9 | 73.9 | 70.3 |
| Tg(°C.) | 656 | 654 | 661 | 657 | 655 | 652 |
| At(°C.) | 717 | 718 | 719 | 723 | 733 | 717 |

The spectral transmittance of each of thus prepared EMAs with 12 kinds of compositions in a broad wavelength band extending from 300 to 1,000 nm was measured, whereby the absorption characteristic thereof was evaluated. It was confirmed that all these EMAs had a relatively favorable absorbing capacity throughout the wavelength range from 300 to 1,000 nm. Tables 1 and 2 also show the transmittance of each EMA at a wavelength of 790 nm which is in near infrared region.

First, while sample No. 40 containing $Ni_2O_3$ exhibited the highest transmittance (i.e., lowest absorptivity) at the wavelength of 790 nm among the samples, its level is not unpractical yet.

Next, among sample Nos. 57 to 61 which include, instead of $Ni_2O_3$, $Co_2O_3$ as a colorant oxide together with FeO and $Fe_2O_3$, sample No. 58 containing the highest total of contents of FeO and $Fe_2O_3$ exhibited the lowest transmittance.

Also, in sample Nos. 70 and 71 which do not contain $B_2O_3$ and whose total of contents of FeO and $Fe_2O_3$ is nearly the same level as that of sample No. 58, the glass transition point (Tg) and yield point (At) were improved.

Further, in sample Nos. 75 and 76 in which 22.2% of FeO or $Fe_2O_3$ was individually used, transmittance was remarkably improved.

In view of these results, it has been elucidated that, when the contents of FeO and $Fe_2O_3$ are increased, a sufficiently high absorptivity can be obtained without other kinds of colorant oxides.

Based on this point of view, while both FeO and $Fe_2O_3$ were used, studies were made to increase their contents. As a result, sample Nos. 74 and 80 shown in Table 2 were prepared. Both of these samples exhibited a remarkably favorable absorbing capacity at the wavelength of 790 nm.

In samples 74 to 76 and 80 in which transmittance was remarkably improved, 18 to 40% by weight of $SiO_2$ is contained while the total of contents of FeO and $Fe_2O_3$ is not smaller than 20% by weight.

Figure 3:
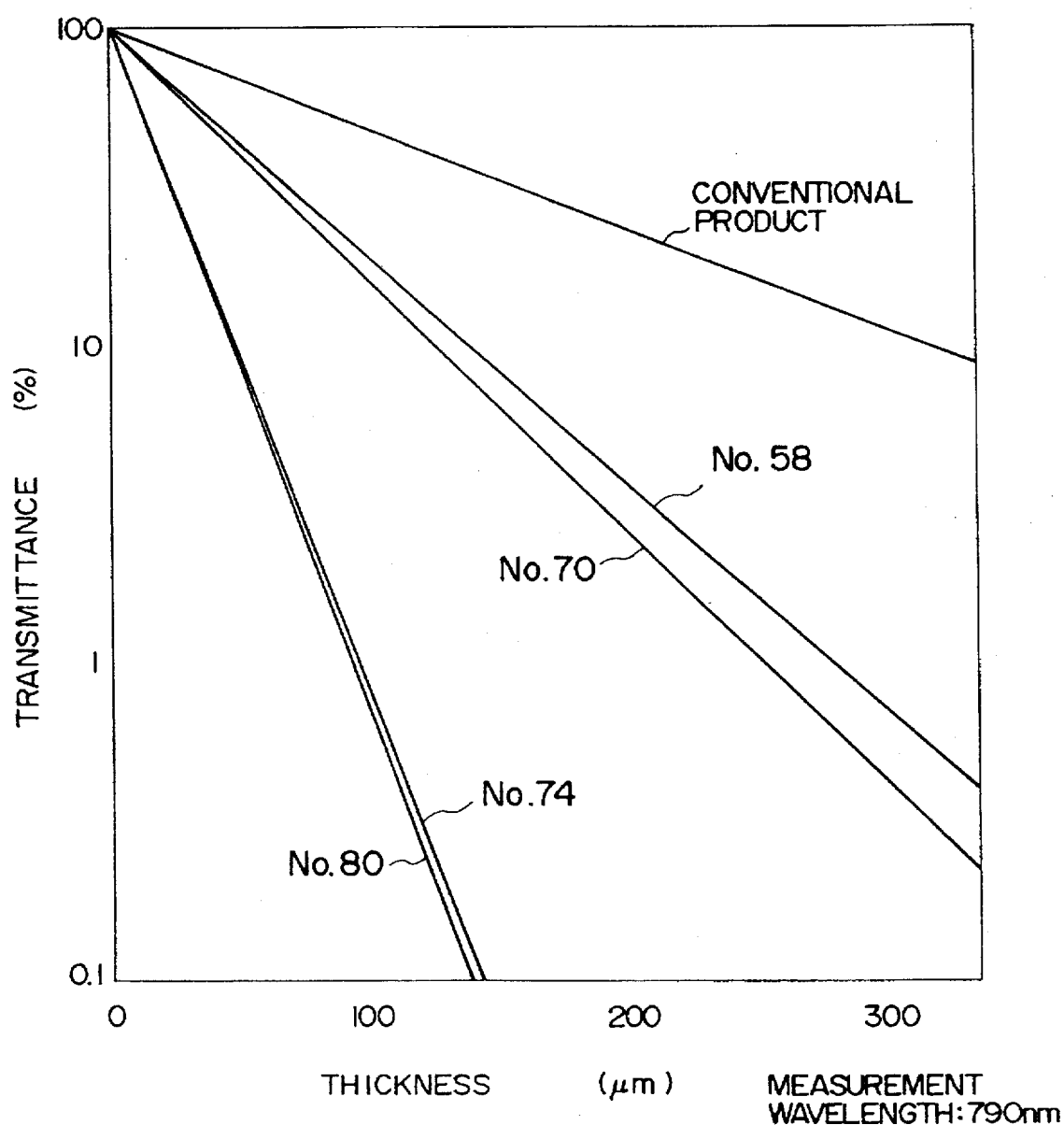
FIG. 3 is a graph showing a relationship between transmittance of an absorber glass and the thickness thereof with respect to a wavelength of 790 nm.

The transmittances of sample Nos. 74 and 80 were further investigated in detail. Here, for comparison, a conventional EMA composed of 19% of $SiO_2$, 6% of $B_2O_3$, 16% of $La_2O_3$, 36% of BaO, 8% of $TiO_2$, 2.4% of FeO, 5.6% of $Fe_2O_3$, and 1% of $Co_2O_3$ was used as a conventional product which did not conform to the present invention. First, their changes in transmittance with respect to thickness are shown in FIG. 3 together with those of sample Nos. 58 and 70 whose results were relatively favorable. As can be seen from FIG. 3, as compared with the conventional product, sample Nos. 58, 70, 74, and 80 exhibited favorable absorption characteristics at the wavelength of 790 nm and, in particular, sample Nos. 74 and 80 exhibited remarkably favorable results.

Next, FIG. 4 shows spectral transmittances of sample Nos. 74 and 80 and the conventional product when their thickness is 130 μm. As can be seen from FIG. 4, as compared with the conventional product, sample Nos. 74 and 80 exhibited remarkably favorable absorption characteristics throughout the whole wavelength region.

Further, the EMA of sample No. 80 and the EMA of the conventional product were used together with known core and clad to prepare respective FOPs having a numerical aperture (N.A.) of 1, and the spectral transmittance of each FOP with a thickness of 3 mm was measured. FIG. 5 shows thus measured spectral transmittances. As can be seen from FIG. 5, in the FOP using the EMA of the conventional product, the transmittance rises in near infrared region so that there is plenty of stray light and the effect of the absorber is small. In the FOP using the EMA of the present invention (sample No. 80), by contrast, it can be seen that there is no rise of transmittance in near infrared region, whereby the light is absorbed efficiently. Since this FOP has a numerical aperture (N.A.) of 1, in the case of diffused light, the whole light component which has entered the core portion repeats total reflection within the fiber and then exits from the opposite side of the same fiber. The other light component which has entered the clad and absorber portions, on the other hand, when the capacity of the absorber is incomplete, repeats refraction and is emitted therefrom at an identical angle while being attenuated. Accordingly, these stray light components are added to the image transmitted by the core portion of the FOP, thereby deteriorating the resolution of the transmitted image. Since the FOP in accordance with the present invention can greatly absorb stray light in near infrared region while similarly absorbing stray light throughout ultraviolet to visible region, it can transmit images while maintaining a favorable resolution in a broad range.

As explained in the foregoing, since the absorber glass of the present invention can greatly absorb stray light in near infrared region while similarly absorbing stray light throughout ultraviolet to visible region, it can transmit images while maintaining a favorable resolution in a broad range.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Application No. 168711/1995 filed on Jul. 4, 1995 is hereby incorporated by reference.

What is claimed is:

1. A glass comprising in % by weight:
   18 to 40% of $SiO_2$;
   25 to 40% of BaO;
   4 to 20% of $La_2O_3$;
   3 to 30% of FeO; and
   3 to 30% of $Fe_2O_3$.

2. A glass according to claim 1, further comprising not greater than 10% by weight of $B_2O_3$.

3. A glass according to claim 1, further comprising not greater than 15% by weight of $TiO_2$.

4. A glass according to claim 1, further comprising not greater than 15% by weight of $Co_2O_3$.

5. A glass according to claim 1, wherein said glass satisfies, in % by weight, the following relationship:

$$\text{(content of } SiO_2\text{)+(content of FeO)+(Content of } Fe_2O_3\text{)>35\%}.$$

6. A glass according to claim 1, further comprising 3 to 6% by weight of $Ni_2O_3$.

7. A glass according to claim 1, wherein said glass is substantially free of CoO and $Co_2O_3$.

8. A glass comprising in % by weight:
   20 to 35% of $SiO_2$;
   5 to 12% of $TiO_2$;
   25 to 35% of BaO;
   7 to 10% of $La_2O_3$;
   3 to 9% of FeO; and
   7 to 21% of $Fe_2O_3$.

9. A glass according to claim 8, further comprising not greater than 6% by weight of $B_2O_3$.

10. A glass according to claim 8, further comprising not greater than 10% by weight of $Co_2O_3$.

11. A glass according to claim 8, wherein said glass is substantially free of CoO and $Co_2O_3$.

12. A glass comprising in % by weight:
23 to 31% of $SiO_2$;
7 to 11% of $TiO_2$;
30 to 32% of BaO;
7 to 8% of $La_2O_3$;
3 to 5% of FeO; and
8 to 12% of $Fe_2O_3$,
wherein said glass is substantially free of CoO and $Co_2O_3$.

13. A glass according to claim 12, further comprising not greater than 6% by weight of $B_2O_3$.

14. A glass comprising in % by weight:
28 to 31% of $SiO_2$;
7 to 11% of $TiO_2$;
30 to 32% of BaO;
7 to 8% of $La_2O_3$;
6 to 9% of FeO; and
15 to 21% of $Fe_2O_3$,
wherein said glass is substantially free of CoO and $Co_2O_3$.

15. A glass according to claim 14, wherein said glass is substantially free of $B_2O_3$.

* * * * *